INVENTOR
Harold O. Goddard
BY
ATTORNEY

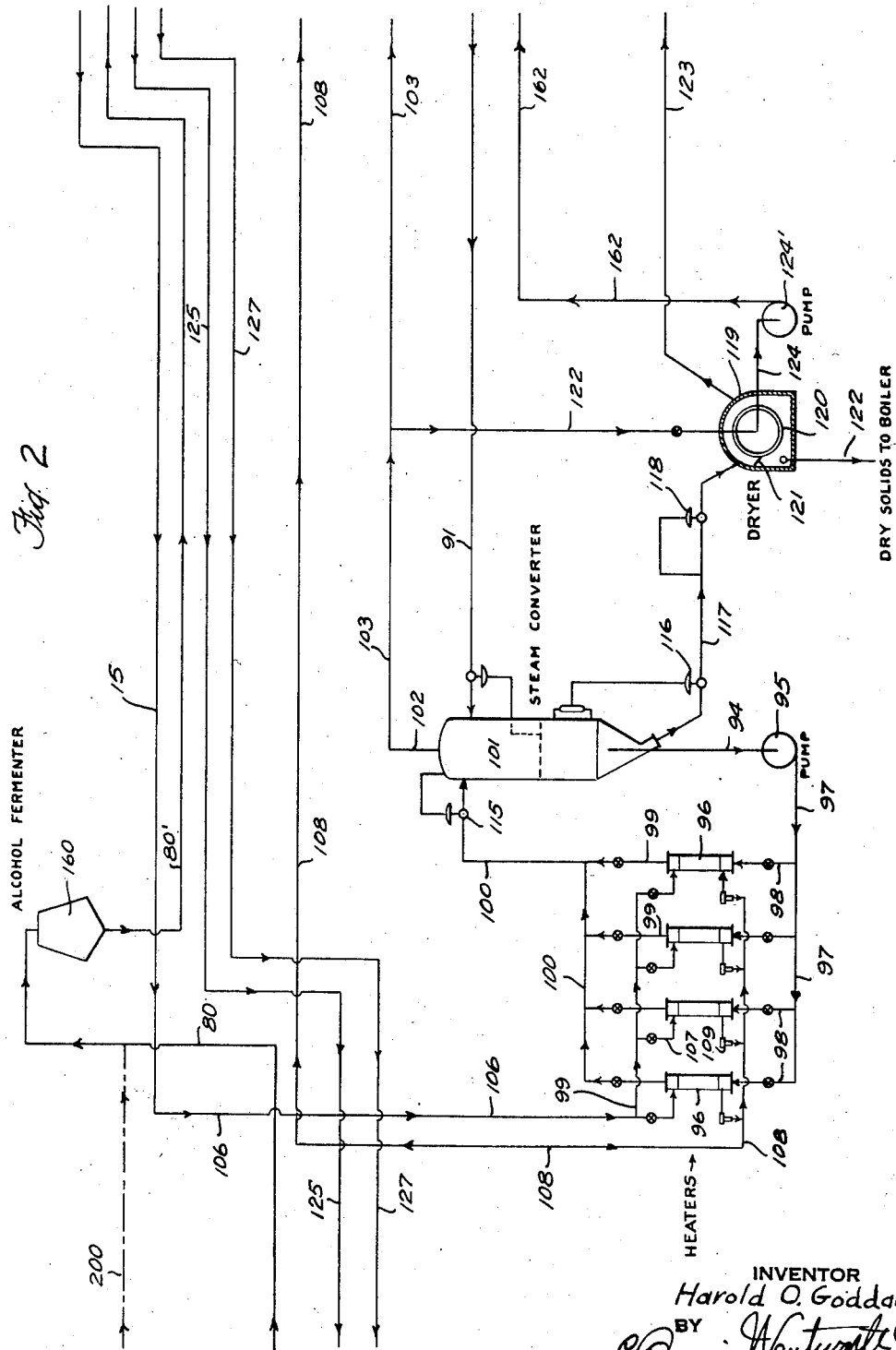

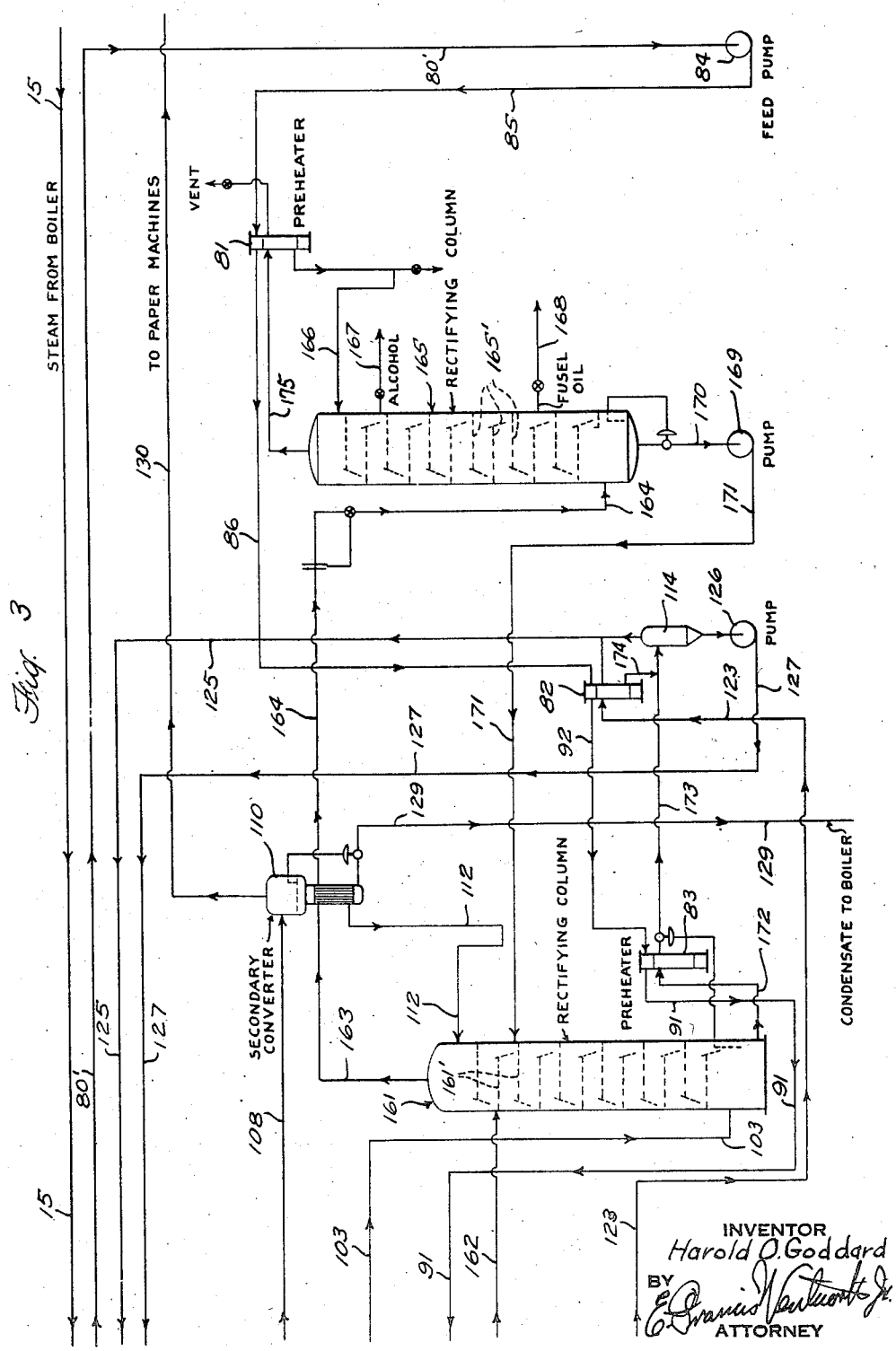

United States Patent Office 2,801,206
Patented July 30, 1957

2,801,206
PROCESS OF RECOVERING ALCOHOL FROM WASTE SULPHITE LIQUOR

Harold Oliver Goddard, St. Catharines, Ontario, Canada

Original application April 2, 1949, Serial No. 85,116, now Patent No. 2,676,883, dated April 27, 1954. Divided and this application March 25, 1954, Serial No. 418,724

6 Claims. (Cl. 195—39)

This invention relates to the recovery of useful products from waste sulphite liquor discharged by sulphite pulp plants.

The present invention is a division of application Serial No. 85,116, filed April 2, 1949, now Patent No. 2,676,883.

Heretofore, numerous products have been recovered from waste sulphite liquor. For example, the sugars therein have been recovered and used in the production of alcohol. Sulphur dioxide gas and sulphites have been recovered from said liquor. Waste sulphite liquor has also been concentrated or dried and the liquor in concentrated or dried form has been burned. While prior recovery methods of which I am aware have been to some degree successful in accomplishing their purposes, they have not been economic in their functioning nor have they been trouble-free in their operation.

The present invention provides a method of and apparatus for the recovery of useful products from waste sulphite liquor in which said products are economically recovered.

This invention also provides a waste sulphite liquor conversion method, and apparatus in which the sugars contained in waste sulphite liquor are economically converted into alcohol and in which the sugar denuded liquor is concentrated and dried.

In accordance with the present invention, steam for use in the operation of a sulphite pulp plant is generated to a pressure higher than that required for the operation of the digesters, paper machine dryers, or other steam consumers in said plant, and at the higher pressure is used to concentrate and to dry the waste sulphite liquor into a form which is usable as a fuel in a steam generator. The dry solids from the concentrated and dried waste sulphite liquor, which contain approximately 8,000 B. t. u. per pound of dry solids, are produced, in accordance with the present invention, in a finely divided state and may readily be substituted for pulverized coal to fire said steam generator. The steam, after use in concentrating and drying the waste sulphite liquor, is then used, at its reduced pressure, to operate the above-mentioned steam consumers of the sulphite pulp plant. By borrowing steam between the plant steam generator and the plant steam consumers, the waste sulphite liquor conversion is accomplished with a minimum of steam loss in evaporation.

Should it be desired to recover products other than dry, finely divided solids from the waste sulphite liquor, this may also be done by the method and apparatus of the present invention. For example, waste sulphite liquor, after it has been concentrated and the sulphur dioxide gas has been removed therefrom, is passed to apparatus for converting the sugars in the waste sulphite liquor to alcohol, the water and alcohol being evaporated from the waste sulphite liquor solids by steam from the plant steam generator. The heat of the alcohol and water vapors is used to rectify the alcohol prior to conversion of said heat to usable steam in the steam consumers. The alcohol denuded liquor is concentrated and dried so that the above-mentioned finely divided dried product may be secured. A small alcohol plant which is economical in operation is thereby provided and a finely divided dried product usable for fuel is obtained.

The invention will be understood from the following description when considered in connection with the accompanying drawing forming a part thereof and in which:

Fig. 2 is a view showing an embodiment of the invention wherein alcohol is recovered from waste sulphite liquor, and Fig. 3 is a continuation of the view shown in Fig. 2.

Like characters of reference refer to the same or to similar parts throughout the views.

Figure 1:
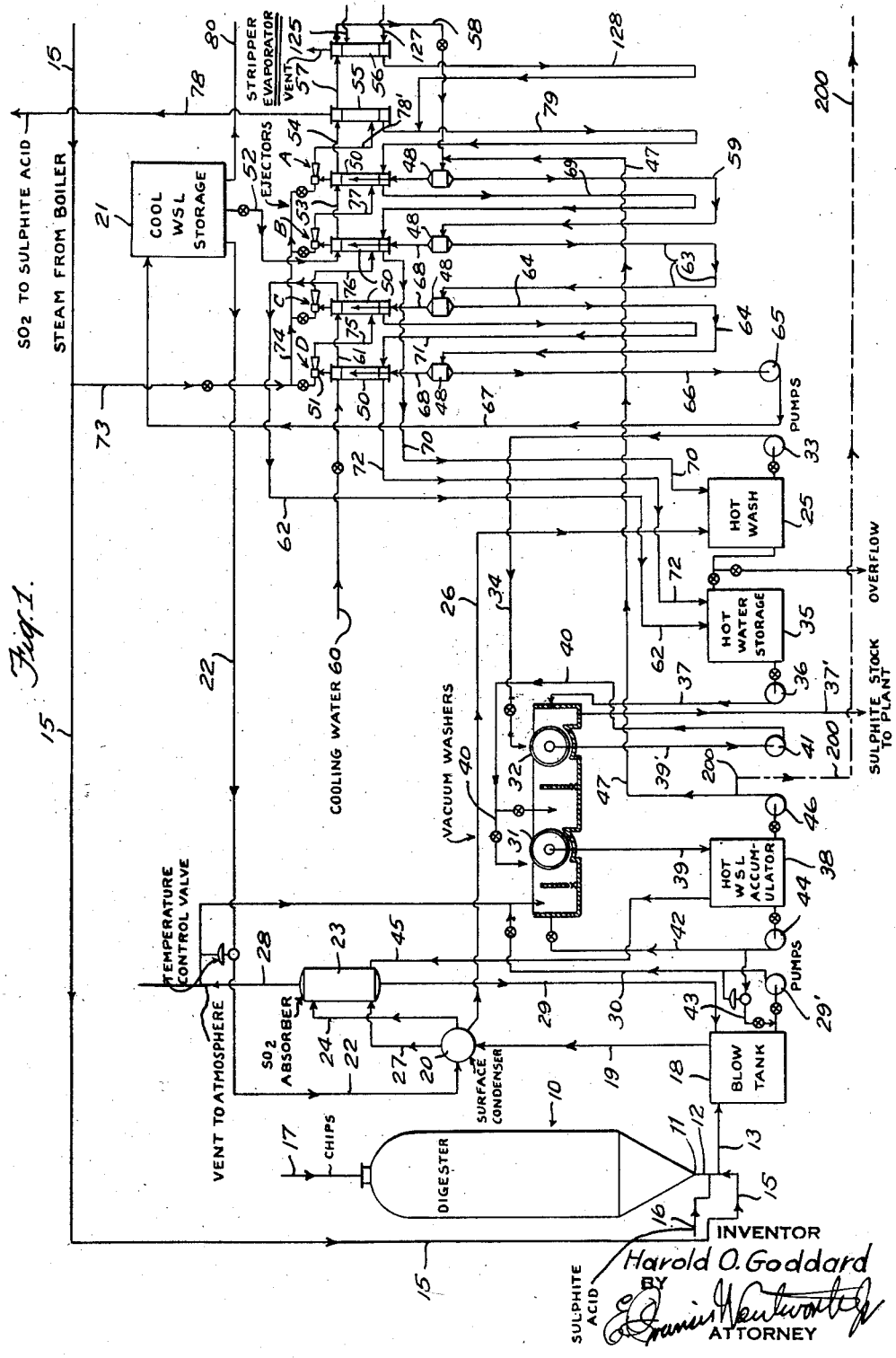
Fig. 1 is a diagrammatic view of an arrangement of a portion of the apparatus of the present invention.

Referring to Fig. 1 of the drawing, the reference numeral 10 designates a digester of conventional construction which discharges through the bottom 11 thereof into a pipe 12 communicating with a discharge conduit 13. Steam for heating the contents of the digester to cooking temperature is conducted thereto from a steam generator not shown through steam line 15 and pipe 12 while sulphite acid used in the digester is introduced at the bottom thereof through pipes 16 and 12. Chips are conducted into the top of the digester through a conduit 17.

As is usual in the operation of such a digester, at the start of each batch the digester 10 is loaded with wood chips conducted thereinto through conduit 17 and filled with sulphite acid which enters the digester through pipes 16 and 12. The charge of wood chips and sulphite acid is then cooked by steam conducted to the digester through lines 15 and 12. Upon completion of the cooking operation, the contents are discharged from digester 10 into blow tank 18 through line 12 and discharge conduit 13.

Gases ($SO_2$) flashed off during blow-down are vented from blow tank or pit 18 through gas line 19 into a surface condenser 20 wherein vapor in the gase is condensed by flowing in contact with surface cooled by cool waste sulphite liquor collected in a storage tank 21 during operation of the present invention as hereinafter described. The cool waste sulphite liquor is conducted to condenser 20 through line 22 and, after condensing vapor in the $SO_2$ gas and becoming heated by passing in heat exchange relationship with said gas, is passed to the upper part of an absorber 23 through conduit 24. Condensate from condenser 20 flows to hot wash container 25 through line 26 while the $SO_2$ gas, after the vapor has been removed therefrom, is passed to the lower part of absorber 23 through gas line 27. Gases flowing into absorber 23 through gas line 27 are absorbed by waste sulphite liquor flowing into the absorber through conduit 24. Any unabsorbed gases are vented to the atmosphere from the absorber through outlet 28. The waste sulphite liquor, after absorbing $SO_2$ in the absorber, flows to blow tank 18 through conduit 29 where it is mixed with the blown-down pulp from digester 10 to reduce the pulp consistency so that the same may be pumped from said tank. The temperature of the pulp and liquor in blow-tank 18 wound normally be approximately 185° F. at which temperature the $SO_2$ therein would remain in solution.

The solution of pulp and waste sulphite liquor is pumped from blow tank 18 by pump 29' through line 30 into suitable pulp washing apparatus such as rotary vacuum filters 31 and 32 arranged in series. The washing apparatus would normally be designed to wash approximately 90% or more of the waste sulphite liquor from the pump with a dilution of less than one pound of water per pound of pulp and at the same time discharge liquor at the temperature at which it was received, that is, approximately 185° F. The mixture entering the washing apparatus through conduit 30 is washed with a mixture of condensate from condenser 20, which is discharged into hot wash container 25 through conduit 26, and hot water received from the evaporating apparatus hereinafter described. The condensate and hot water mixture is pumped by pump 33 from container 25 through line 34 into the washing apparatus. Also hot water from water storage 35, which water is received from evaporating apparatus hereinafter described, is pumped into the washing apparatus by pump 36 through line 37. Washed pulp is removed from the washing apparatus through outlet conduit 37' while hot waste sulphite liquor is passed from washer 31 into hot waste sulphite accumulator 38 through line 39. Waste sulphite liquor from washer 32 is recirculated to the washer through recirculating lines 39' and 40 by recirculating pump 41. To maintain the proper pulp consistency in the washers and also in blow tank 18, a portion of the hot waste sulphite liquor from accumulator 38 is passed to the washers through line 42 and to the blow tank through lines 42 and 43 by circulating pump 44. $SO_2$ gas from accumulator 38 is conducted to absorber 23 through gas line 45 so that said gas will be scrubbed along with the gas entering absorber 23 through line 27.

Waste sulphite liquor from accumulator 38 is pumped by pump 46 through waste sulphite liquor conduit 47 to stripper evaporator apparatus where said waste sulphite liquor is evaporated, cooled, condensed, concentrated and stripped of $SO_2$ gas. Each stripper evaporator comprises a flash chamber and a condenser which are maintained under vacuum by means of a steam ejector.

The stripper evaporator, as shown in Fig. 1, consists of four stages of evaporation indicated at A, B, C, and D. Each stage comprises a flash chamber 48 and a condenser 50 both of which are maintained under vacuum by a steam ejector 51. Cooling medium for condensers 50 of stages A and B is provided from the cool waste sulphite liquor storage tank 21 and flows through said condensers serially, passing into condenser 50 of stage B in line 52. After flowing through condenser 50 of stage B, the waste sulphite liquor flows to condenser 50 of stage A by way of line 53 thereafter passing through said condenser and outwardly therefrom into pipe 54. Condensers 50 of stages D and C are supplied with a water cooling medium which enters condenser 50 of stage D through cool water conduit 60 and passes through said condensers serially, flowing from condenser 50 of stage D to condenser 50 of stage C through line 61 and from the condenser of stage C into hot water storage 35 through conduit 62. Hot water for use in the pulp washing apparatus, hereinbefore described, is thusly provided.

From pipe 54, the waste sulphite liquor is passed serially through condensers 55 and 56, said condensers communicating with one another through pipe 57. Waste sulphite liquor from condenser 56 flows to flash chamber 48 of stage A through conduit 58 while waste sulphite liquor from the hot waste sulphite liquor accumulator 38 flowing through conduit 47 also passes to said flash chamber. The hot waste sulphite liquor from accumulator 38 and from the condensers 50, 55, and 56 is cooled and concentrated by successively flashing it through flash chambers 48 of stages A, B, C, and D, the liquid from chamber 48 of stage A flowing therefrom to the flash chamber of stage B through line 59 in which chamber it is flashed and passed to chamber 48 of stage C through conduit 63. In the flash chamber of stage D, the liquor flowing thereto through line 64 is flashed and the remaining liquid flows to pump 65 through conduit 66 and is pumped to the cool waste sulphite liquor tank 21 through line 67.

The temperature of the waste sulphite liquor flowing through conduit 47 to flash chamber 48 of stage A would be at substantially 185° F. while the waste sulphite liquor flowing from condensers 50, 55 and 56 into flash chamber 48 through conduit 58 enters said flash chamber at approximately 160° F. The temperature of the waste sulphite liquor is progressively reduced by the flash chambers 48 of stages A, B, C, and D so that the temperature of the liquor leaving flash chamber 48 of stage D through conduit 66 and passing to the cool waste sulphite liquor tank 21 through line 67 is at substantially 100° F.

The vapor flashed off in flash chambers 48 flows to the condenser 50 of the stage with which the chamber is associated through a line 68 thereafter to be condensed in said condensers 50. The condensate from condenser 50 of stage A is passed to condenser 50 of stage B through conduit 69 wherein it is flashed and the condensate from the condenser 50 of stage B flows to hot wash container 25 through line 70. Condensate produced in condenser 50 of stage C is passed to condenser 50 of stage D through conduit 71 and is flashed in the condenser of stage D. The condensate forming in condenser 50 of stage D is passed to hot water storage 35 through line 72. In this manner, the heat contained in the condensate is recovered and the $SO_2$ gas removed therefrom.

Steam line 15 is connected to each of the ejectors 51 of stages A, B, C, and D, through steam conduits 73 and 74, steam conduit 73 being in communication with steam line 15 while conduit 74 is in communication with conduit 73. Ejector 51 of stage D receives steam from conduit 73 while the ejector of stages C, B, and A respectively, receive steam from conduit 74. The vapor removed from condenser 50 of stage D by ejector 51 flows through line 75 to condenser 50 of stage C wherein the condensibles are condensed and from which the vapor is withdrawn by ejector 51 for stage C. The vapors removed from the condenser for stage C by the ejector therefor are passed to condenser 50 of stage B wherein condensibles are condensed therefrom. Vapor withdrawn by ejector 51 of stage B flows to condenser 50 of stage A through line 77 and the condensible portion thereof is condensed in the condenser of stage A. The ejector of stage A discharges into condenser 55 through line 78'. The non-condensibles from condenser 55, which comprises $SO_2$ gas, is conducted through conduit 78 to the sulphite acid container for the plant, not shown, while condensate from condenser 55 flows through line 79 to condenser 50 of stage A wherein it is flashed. In the present invention, the steam ejectors 51 of stages A, B, C, and D serve a double purpose in that they maintain a vacuum on the flash chambers 48 and condensers 50 of the stage with which they are associated and also build the pressure of $SO_2$ gas back to a desired amount, for example, one pound per square inch gauge. The ejector steam is condensed from the $SO_2$ gas in the various condensers so that a water saturated $SO_2$ gas is released from the stripper evaporator through conduit 78. It will be noted that in accordance with the method and apparatus of the present invention, the waste sulphite liquor flowing to storage tank 21 through line 67 is concentrated without the use of auxiliary heat or excessive heating surfaces and that the $SO_2$ gas is removed therefrom and reclaimed.

The waste sulphite liquor in tank 21 is used for the production of alcohol. In the embodiment of the invention shown in Fig. 2, cooled waste sulphite liquor from tank 21 is passed by way of line 80 to alcohol fermenter 160 wherein fermentation is carried out in the usual way with a suitable distilling yeast. Alternatively, waste sulphite liquor may be passed from accumulator 38 (Fig. 1) by pump 46 through lines 47, 200 and 80 to alcohol fermenter 160 (Fig. 2). Nutrients necessary for supporting of the yeast are also supplied. After fermentation, the fermented waste sulphite liquor flows through conduit 80' into suction feed pump 84 (see Fig. 3) thereafter to be discharged from said pump into preheater 81 through conduit 85. After becoming heated in preheater 81, the fluid is passed through line 86 to preheater 82 wherein it is further heated and thereafter passed through conduit 92 into preheater 83. Heated fluid from preheater 83 flows into conduit 91 and passes into steam converter 101 (see Fig. 2) which is similar to the converter shown in Fig. 3.

In converter 101, the fluid is vaporized, a portion of the vapor passing outwardly of the converter through lines 102 and 103 while another portion thereof is condensed. A part of the condensed portion passes outwardly thereof through conduit 94 and is pumped by pump 95 through conduits 97 and 98 into heaters 96, the heated fluid flowing from the heaters 96 into converter 101 through line 100. A concentrated portion of the condensed fluid from converter 101 flows through line 117 into drum-type dryer 119.

The vapor flowing outwardly of converter 101 through lines 102 and 103 passes into the lower portion of a rectifying column 161, a portion of said vapor being conducted to dryer 119 through line 122 for use as a heating medium in the dryer. Condensate formed in dryer 119 is pumped therefrom by pump 124' through line 124 which discharges it into conduit 162. Conduit 162, in turn, discharges the condensate into the upper part of rectifying column 161. In rectifying column 161, the condensate flows downwardly through vapor and liquid contacting devices 161' passing countercurrent to and in contact with the vapor discharged into the lower part of said column through line 103. Vapor from the rectifying column 161 flows outwardly thereof through vapor conduit 163 and into secondary steam converter 110 (Fig. 3). A part of the condensate formed in secondary steam converter 110 passes therefrom into line 112 and is discharged into the upper part of rectifying column 161 wherein said condensate passes downwardly countercurrent to and in contact with the vapor passing upwardly within the column. The remainder of the condensate from converter 110 flows through conduit 129 to a boiler (not shown).

Vapor from secondary steam converter 110 passes through vapor conduit 164 into the lower portion of another rectifying column 165. In rectifying column 165 said vapor flows upwardly through vapor and liquid contact devices 165' within the column countercurrent to and in contact with condensate which enters the upper part of column 165 through line 166 which line receives said condensate from preheater 81. Waste sulphite fluid from fermenter 160 which enters preheater 81 through line 85 is heated in said preheater by vapor from rectifying column 165 flowing thereinto through conduit 175. The condensate from the vapor flows from said preheater through line 166 and is returned to said column as hereinbefore described. Alcohol is withdrawn from column 165 through conduit 167 and fuel oil is removed from the column through conduit 168. Condensate is pumped from the lower part of column 165 by pump 169 which receives said condensate through pipe 170 connected at one end thereof to the bottom of said column and at the other end to the suction of said pump. Pump 169 provides pressure to pump the condensate from column 165 to the upper part of rectifying column 161 through conduit 171, said condensate thereafter passing downwardly in the column countercurrent to and in contact with the vapor flowing upwardly therein.

Preheater 83 is heated by condensate which it receives through line 172 connected to said preheater and the lower part of rectifying column 161. The condensate from said preheater is discharged therefrom through line 173 into flash chamber 114 which is similar to flash chamber 101 of Fig. 2. Preheater 82 receives vapor from dryer 119 through line 123, the condensate from preheater 82 being discharged into line 173 through pipe 174 and vapor from said preheater being discharged into steam outlet conduit 125 from flash chamber 114. The steam outlet conduit from flash chamber 114 discharges into condenser 56 of Fig. 1 while condensate from flash chamber 114 is passed through line 127 by pump 126 into condenser 56.

With the embodiment of the invention shown in Fig. 2, alcohol distillation from waste sulphite liquor removed from a mixture received from a digester and concentrated, as shown in Fig. 1 is accomplished without the necessity of using extra steam for distillation. This results in a more efficient use of steam and a great reduction in the steam cost for distillation.

It will be apparent that various modifications may be made in the form of the apparatus herein disclosed and in the steps of the process herein described without departing from the spirit of the invention which is not to be limited excepting by the scope of the appended claims.

What is claimed is:

1. A process of recovering alcohol from residual waste sulphite liquor obtained from a mixture of fibrous material and sulphite cooking liquor which comprises concentrating said residual waste sulphite liquor, feeding concentrated waste sulphite liquor into an alcohol fermenting zone, flowing fermented waste sulphite liquor into a heating zone, further concentrating the heated liquor by flashing vapor therefrom in a zone of lower pressure than said heated liquor, flowing the further concentrated waste sulphite liquor from the zone of lower pressure to a drying zone, passing a portion of the vapor flashed from the lower pressure zone into said drying zone in heat exchange relationship with said waste sulphite liquor to cause drying of the latter in solid form and condensation of vapor, flowing another portion of said flashed vapor from said lower pressure zone into a rectifying zone, flowing the condensed vapor from the drying zone into the rectifying zone in heat exchange relationship with said another portion of flashed vapor, flowing vapor from said rectifying zone to a heat exchange zone for condensing a portion of said vapor, flowing the uncondensed portion of the vapor from the heat exchange zone to a second rectifying zone, and flowing vapor from said second rectifying zone to said heating zone in heat exchange relationship with the fermented waste sulphite liquor therein.

2. A process of recovering alcohol from residual waste sulphite liquor obtained from a mixture of fibrous material and sulphite cooking liquor which comprises feeding residual waste sulphite liquor into an alcohol fermenting zone, flowing fermented waste sulphite liquor into a heating zone, concentrating the heated fermented liquor by flashing vapor therefrom in a zone of lower pressure than said heated liquor, flowing the concentrated waste sulphite liquor from the zone of lower pressure to a drying zone, passing a portion of the vapor flashed from the lower pressure zone into said drying zone in heat exchange relationship with said waste sulphite liquor to cause drying of the latter in solid form and condensation of vapor, flowing another portion of said flashed vapor from said lower pressure zone into a rectifying zone, flowing the condensed vapor from the drying zone into said rectifying zone in heat exchange relationship with said another portion of flashed vapor, flowing vapor from said rectifying zone to a heat exchange zone for condensing a portion of the vapor therein, flowing the uncondensed vapor from the heat exchange zone to a second rectifying zone, flowing uncondensed vapor from the second rectifying zone to said heating zone in heat exchange relationship with the fermented waste sulphite liquid therein whereby said vapor is condensed, and passing the condensed vapor from said heating zone to the second rectifying zone in heat exchange relationship with said uncondensed vapor introduced into said second rectifying zone from the heat exchange zone to obtain relatively pure alcohol.

3. A process of recovering alcohol from residual waste sulphite liquor obtained from a mixture of fibrous material and sulphite cooking liquor which comprises concentrating said residual waste sulphite liquor, feeding the concentrated waste sulphite liquor into an alcohol fermenting zone, flowing fermented waste sulphite liquor into a heating zone, further concentrating the heated fermented liquor by flashing vapor therefrom in a zone of lower pressure than said heated liquor, flowing the concentrated waste sulphite liquor from the zone of lower pressure to a drying zone, passing a portion of vapor flashed from the lower pressure zone into said drying zone in heat exchange relationship with said further concentrated waste sulphite liquor to cause drying of the latter in solid form and condensation of vapor, flowing another portion of said flashed vapor from the zone of lower pressure into a rectifying zone, flowing the condensed vapor from the drying zone into said rectifying zone in heat exchange relationship with said another portion of flashed vapor, flowing vapor from said rectifying zone to a heat exchange zone for condensing a portion of the vapor therein, flowing the uncondensed vapor from the heat exchange zone to a second rectifying zone, flowing uncondensed vapor from the second rectifying zone to said heating zone in heat exchange relationship with the fermented waste sulphite liquid therein whereby said vapor is condensed, and passing the condensed vapor from said heating zone to the second rectifying zone in heat exchange relationship with said uncondensed vapor introduced into said second rectifying zone from the heat exchange zone to obtain relatively pure alcohol.

4. In the operation of a sulphite pulp plant wherein residual waste sulphite liquor is obtained from a mixture of fibrous substance, sulphite cooking liquor and steam, concentrating the residual waste sulphite liquor and liberating sulphur dioxide therefrom, passing the concentrated liquor substantially free of sulphur dioxide to an alcohol fermenting zone, flowing fermented waste sulphite liquor into a heating zone, heating the liquor in the heating zone by steam, further concentrating the heated fermented liquor by flashing vapor therefrom in a zone of lower pressure than said heated liquor, flowing the further concentrated waste sulphite liquor from the zone of lower pressure to a drying zone, passing a portion of the vapor flashed from the lower pressure zone into said drying zone in heat exchange relationship with said further concentrated waste sulphite liquor to cause drying of the latter in solid form and condensation of vapor, flowing another portion of said flashed vapor from the zone of lower pressure into a rectifying zone, flowing the condensed vapor from the drying zone in direct heat exchange relationship with said another portion of flashed vapor, flowing vapor from said rectifying zone to a heat exchange zone for condensing a portion of the vapor therein, flowing the uncondensed vapor from the heat exchange zone to a second rectifying zone, flowing uncondensed vapor from the second rectifying zone to said heating zone in heat exchange relationship with the fermented waste sulphite liquid therein whereby said vapor is condensed, and passing the condensed vapor from said heating zone to the second rectifying zone in heat exchange relationship with said uncondensed vapor introduced into said second rectifying zone from the heat exchange zone to obtain a relatively pure alcohol.

5. In a sulphite pulp plant wherein residual waste sulphite liquor is obtained from a mixture of fibrous substance, sulphite cooking liquor and steam, alcohol fermenting means for fermenting said residual waste sulphite liquor, fluid heating means in communication with the alcohol fermenting means to receive fermented fluid therefrom, a steam converter in communication with the heating means to receive heated liquor therefrom, said steam converter being under such lower pressure than the heating means that vapor is flashed from the concentrate, rectifying means in communication with said steam converter to receive a portion of the vapor flashed in the latter, a dryer in communication with the steam converter to receive concentrated waste sulphite liquor therefrom and another portion of said flashed vapor, said dryer being adapted to pass said concentrated waste sulphite liquor and said another portion of the flashed vapor in heat exchange relationship to dry moisture from said liquor and produce solids therefrom and condense vapor, said rectifying means being in communication with said dryer to receive said vapor condensate therefrom and adapted to pass said portion of the vapor from the steam converter in heat exchange relationship with the condensate from said dryer, a second steam converter communicating with said rectifying means to receive vapor therefrom and adapted to condense a portion of said vapor therein, and a second rectifying means communicating with said second steam converter to receive uncondensed vapor from the latter, said second rectifying means communicating with heating means to deliver uncondensed vapor to the heating zone for condensing said vapor and to receive from the latter the vapor condensed therein, said second rectifying means being adapted to pass the condensed and uncondensed vapor in heat exchange relationship to provide a relatively pure alcohol therefrom.

6. In a sulphite pulp plant wherein residual waste sulphite liquor is obtained from a mixture of fibrous substance, sulphite cooking liquor and steam, means for concentrating said residual waste sulphite liquor and liberating sulphur dioxide therefrom, alcohol fermenting means for fermenting said concentrated waste sulphite liquor, fluid heating means in communication with the alcohol fermenting means to receive fermented fluid therefrom, a steam converter in communication with the heating means to receive heated concentrate therefrom, said steam converter being under such lower pressure that vapor is flashed from the concentrate, rectifying means in communication with said steam converter to receive a portion of the vapor flashed in the latter, a dryer in communication with the steam converter to receive further concentrated fermented waste sulphite liquor therefrom and another portion of said flashed vapor, said dryer being adapted to pass said further concentrated waste sulphite liquor and said another portion of the flashed vapor in heat exchange relationship to dry moisture from said liquor and produce solids therein and condense vapor, said rectifying means being in communication with said dryer to receive said vapor condensate therefrom and adapted to pass said portion of the vapor from the steam converter in heat exchange relationship with the condensate from said dryer, a second steam converter communicating with said rectifying means to receive vapor therefrom and adapted to condense a portion of said vapor therein, and a second rectifying means communicating with said second steam converter to receive uncondensed vapor from the latter, said second rectifying means communicating with heating means to deliver uncondensed vapor to the heating zone for condensing said vapor and to receive from the latter the vapor condensed therein, said second rectifying means being adapted to pass the condensed and uncondensed vapor in heat exchange relationship to provide a relatively pure alchohol therefrom.

References Cited in the file of this patent

UNITED STATES PATENTS

| | | |
|---|---|---|
| 1,103,216 | Moore et al. | July 14, 1914 |
| 1,218,638 | Fest | Mar. 13, 1917 |
| 1,263,486 | Thorne | Apr. 23, 1918 |
| 1,308,184 | McAfee | July 1, 1919 |
| 1,469,958 | Richter | Oct. 9, 1923 |
| 1,864,619 | Richter | June 28, 1932 |
| 2,025,891 | Paulson | Dec. 31, 1935 |
| 2,108,567 | Scholler et al. | Feb. 15, 1938 |
| 2,197,059 | Seidel | Apr. 16, 1940 |
| 2,238,456 | Tomlinson | Apr. 15, 1941 |
| 2,352,304 | Young | June 27, 1944 |
| 2,385,955 | Tomlinson | Oct. 2, 1945 |
| 2,429,143 | Tomlinson | Oct. 14, 1947 |
| 2,494,098 | Lockman | Jan. 10, 1950 |
| 2,574,193 | Savell | Nov. 6, 1951 |
| 2,676,883 | Goddard | Apr. 27, 1954 |

OTHER REFERENCES

Sutermeister: "Chemistry of Pulp and Paper Making," pages 211 and 212 (1941), published by John Wiley and Sons, New York, N. Y.